H. M. PFLAGER.
LOCOMOTIVE BED.
APPLICATION FILED OCT. 27, 1915.
1,174,272.
Patented Mar. 7, 1916.
2 SHEETS—SHEET 2.
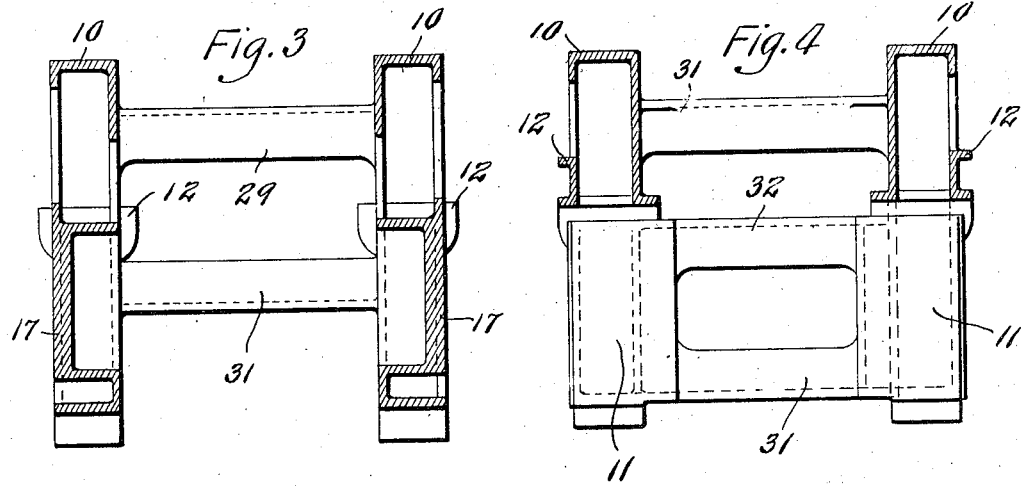
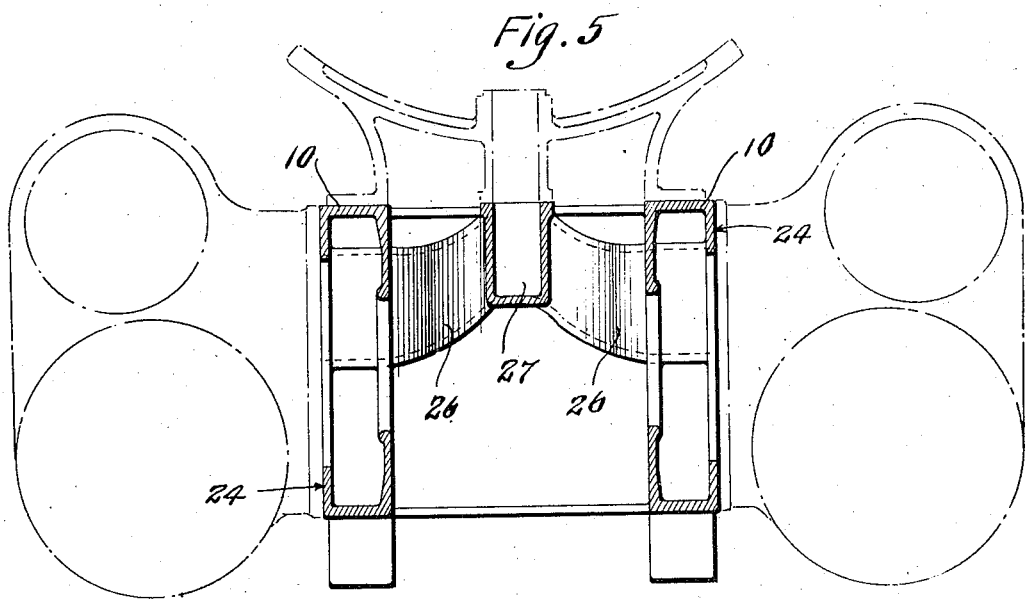
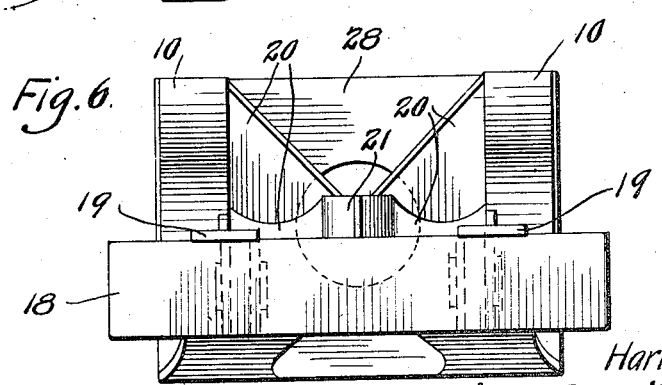
Inventor
Harry M. Pflager
By F. R. Cornwall Atty.

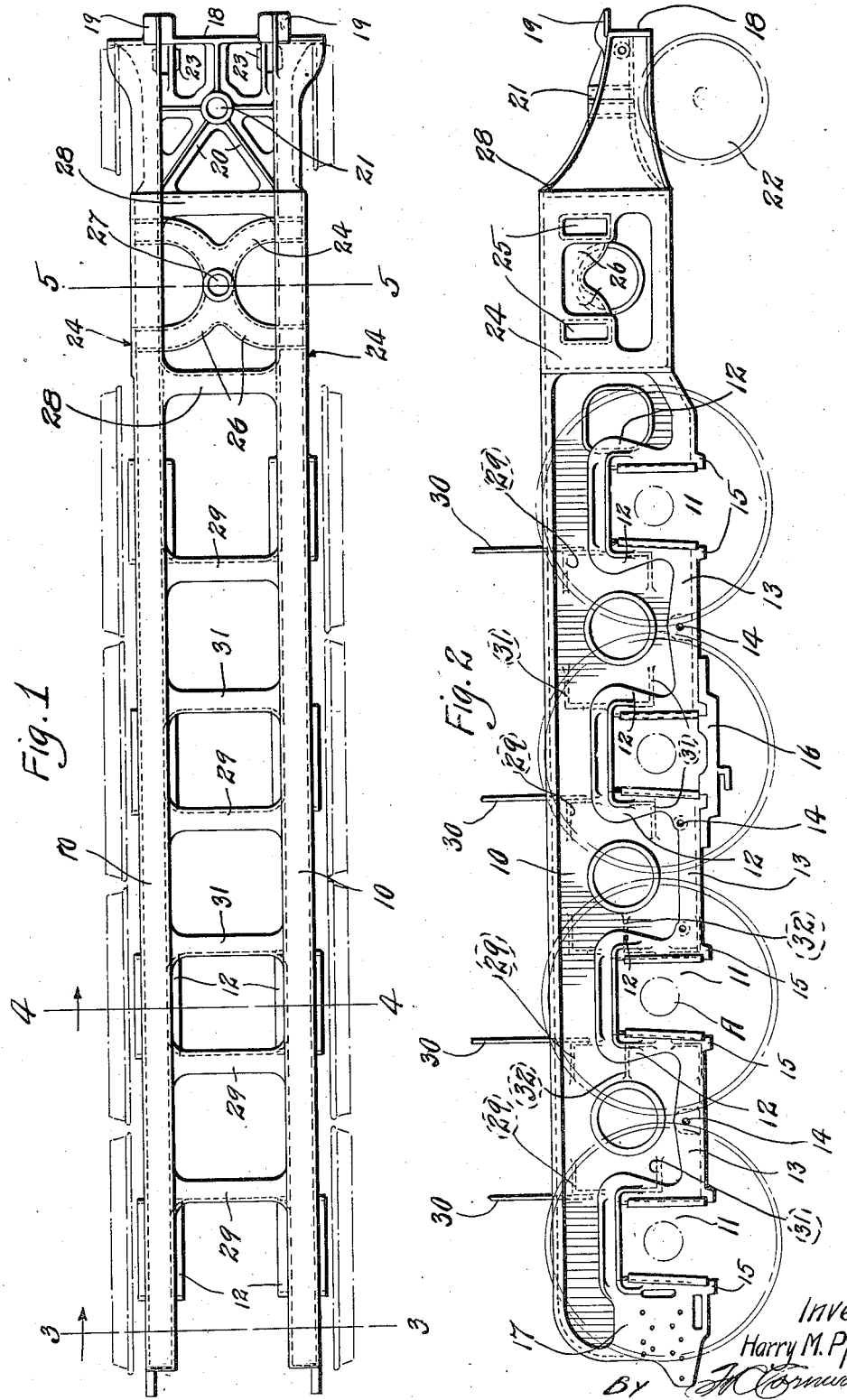

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE-BED.

1,174,272.     Specification of Letters Patent.     Patented Mar. 7, 1916.

Application filed October 27, 1915. Serial No. 58,171.

*To all whom it may concern:*

Be it known that I, HARRY M. PFLAGER, a citizen of the United States, residing at St. Louis, Missouri, have invented a certain new and useful Improvement in Locomotive-Beds, of which the following is a full, clear, and exact description, such as will enable others skilled in the art to which it appertains to make and use the same, reference being had to the accompanying drawings, forming part of this specification.

My invention relates generally to locomotives and more particularly to a one piece frame which is carried by the driving wheels and pony truck and serves as a bed or support for the body of the locomotive.

In ordinary locomotive construction, it will be understood that the main supporting frame or bed usually comprises two separately formed side members which serve as side frames, the same being connected to each other by separately formed cross braces, expansion braces, frame filling pieces, saddle castings, and pony truck center guide casting, said parts being connected by means of machine-fit bolts and rivets. Such construction has many undesirable features; for instance, cost of production of the separate parts, the time and labor involved in fabrication, and further for the reason that the strains and constant vibration developed while the bed or frame is in service tends to loosen the joints between the assembled parts, thereby destroying the strength and stability of the frame and the alinement of various bearings and brackets which receive certain parts necessarily associated with and carried by said bed or frame. Further, the assembling of a number of parts to produce the finished bed or frame requires considerable machine work and other finishing; likewise the setting of a large number of rivets and bolts.

The principal object of my invention is to overcome the objectionable features just mentioned by casting the entire bed or frame in a single piece and forming integral therewith the necessary frame braces, expansion braces, frame filling pieces, cylinder saddle, pony truck center guide and other essential parts, thus producing a very strong, rigid and substantial structure which, in service, effectually resists all strains to which it is ordinarily subjected and which bed is not affected by the constant vibration developed in service.

Further by my improved construction I am able to produce with practically the same amount of metal now used in a fabricated bed or frame, a bed or frame which has much greater strength than said fabricated structure, or to produce a frame having the requisite strength with comparatively less metal and consequently less weight.

With the foregoing and other objects in view, my invention consists in certain novel features of construction and arrangement of parts, hereinafter more fully described, claimed and illustrated in the accompanying drawings, in which—

Figure 1 is a top plan view of a locomotive bed of my improved construction. Fig. 2 is a side elevational view of the bed. Fig. 3 is an enlarged cross sectional view taken approximately on the line 3—3 of Fig. 1. Fig. 4 is an enlarged cross sectional view taken approximately on the line 4—4 of Fig. 1. Fig. 5 is an enlarged cross sectional view taken approximately on the line 5—5 of Fig. 1. Fig. 6 is a front elevational view of a locomotive bed or frame of my improved construction.

As shown in the accompanying drawings, the bed or frame contemplated by my invention includes a pair of side members 10, the main body portions of which are preferably of channel shape in cross section with their flanges outwardly presented. It will be understood that in locomotive beds as ordinarily constructed these side frames are usually in the form of solid rails, rectangular in cross section, but where the frames are cast, it is possible to dispose the metal so as to combine maximum strength with minimum weight.

Formed in the lower portions of the side members 10 are openings 11 which serve as pockets for the journal boxes which receive the driver axles, and formed integral with the side frames to the sides of these pockets are pedestal jaws 12.

The outer portions of the bottom flanges of the side members 10 are preferably provided with upwardly projecting flanges 13, the same preferably extending upwardly along the outer edges of the pedestal jaws 12 and across the openings between said jaws, and said flanges are perforated at various points as designated by 14 in order to receive the pivot pins or bolts for parts of the usual equalizers and swing hangers (not shown).

The lower portions of the pedestal jaws 12 are preferably provided with depending lugs 15 which engage in corresponding recesses formed in the upper portions of usual tie plates 16, which latter span the lower portions of the journal box openings 11 and are secured to the side frames in the usual manner.

The rear portions of the frames 10 may be provided with vertically disposed plates 17 which serve as points of attachment for the forward ends of the side rails of the rear frame of the locomotive.

The forward ends of the side frames 10 are connected by an integrally formed plate 18 to which the usual pilot beam is attached and formed integral with the upper portion of this plate are forwardly projecting brackets 19 which engage on top of the pilot beam.

Connecting the forward portions of the frames 10 immediately to the rear of front plate 18 is an integrally formed skeleton frame 20, the same being provided with a centrally arranged opening 21, which serves as the center guide for the usual pony truck 22. Formed integral with this skeleton casting and preferably at points immediately to the rear of the front plate 18 and adjacent to the side frames 10 are brackets 23 which serve as points of attachment for the usual front end braces (not shown).

Formed integral with the outer portions of the side frames 10 and to the rear of the skeleton frame which serves as the pony truck center guide are vertically disposed plates 24 which are preferably machined so as to receive the usual cylinder castings, the same being shown by dotted lines in Fig. 5. Formed through these plates 24 are exhaust ports 25, the same leading through tubular members 26 to a centrally arranged outlet member 27.

It will be understood that the tubular members 26 are formed integral with the side frames 10 and that the outlet 27 is adapted to be connected to the locomotive stack.

Connecting the frames 10 immediately in front of and to the rear of the tubular member 26 are transversely disposed rails or frames 28 and these parts together with the plates 24 and members 26 constitute what is usually known as the cylinder saddle, inasmuch as said structure serves as a supporting frame for the cylinders of the locomotive which is supported by the bed or frame.

Formed integral with and connecting the upper portions of the frames 10 is a series of transversely disposed expansion plate brackets 29, the same being of any desired cross sectional shape, it being understood that the lower portions of the expansion plates 30 which support the locomotive body are fixed in any suitable manner to these brackets.

Arranged at various points between the frames 10 and integrally connected thereto are transversely disposed members 31 which perform the functions of cross braces or frame filling pieces, the same being of any desired cross sectional shape and arranged so as to give the greatest possible degree of strength and stability to the bed or frame.

In view of the fact that the greatest strains will be imparted to the bed adjacent to the opening occupied by the journal boxes for the main driving axle, which latter in the present instance is designated by the letter A, it is desirable that the bed or frame be particularly reinforced adjacent to this opening and this may be done by arranging a pair of transversely disposed braces between the frames 10 at each side of this particular opening, said reinforcing braces being designated by the numeral 32.

A locomotive bed or frame of my improved construction combines great strength and rigidity with minimum weight, can be easily and cheaply produced inasmuch as it can be readily cast in a single piece and the elimination of joints in the bed or frame does away with structural weaknesses which invariably develop where an assembled or fabricated structure is subjected to service strains and vibrations.

A one piece casting can be produced in much less time and with less labor and consequent expense than a frame which is built up from a number of structural shapes and special castings, and which are united by bolts, rivets and the like, for the assembling of parts necessarily involves considerable machine work, together with the formation of rivet holes and time and labor incident to the setting of the bolts and rivets.

It will be readily understood that minor changes in the size, form and construction of the various parts of my improved locomotive bed or frame can be made and substituted for those herein shown and described, without departing from the spirit of my invention, the scope of which is set forth in the appended claims.

I claim:

1. A locomotive bed cast in a single piece and comprising a pair of side members in which are formed journal box openings, and a series of flanged transversely disposed expansion plate brackets formed integral with and connecting said side members.

2. A locomotive bed cast in a single piece and comprising a pair of side members, and a series of transversely disposed members, certain of which latter constitute expansion plate brackets.

3. A locomotive bed cast in a single piece and comprising a pair of side members in which are formed openings adapted to receive the journal boxes of the locomotive driver axles, and exhaust tubes integral with and arranged between the forward portions of said side frames.

4. A locomotive bed cast in a single piece and comprising a pair of side members in which are formed openings adapted to receive the journal boxes of the locomotive driver axles, pedestal jaws on said side frames to the sides of said openings, and transversely disposed expansion plate brackets integral with and forming a connection between said side frames.

5. A locomotive bed cast in a single piece and comprising side frames having pedestal jaws, and transversely disposed expansion plate brackets integral with and forming a connection between said side frames.

6. A locomotive bed comprising a pair of integrally connected cast side frames in which are formed openings adapted to receive the journal boxes of the locomotive driver axles said side frames being substantially channel-shape in cross section with outwardly presented flanges, and vertically disposed reinforcing flanges on the lower flanges of said side frames, which vertically disposed flanges extend over the journal box openings.

7. A locomotive bed comprising a pair of integrally connected cast side frames in which are formed openings adapted to receive the journal boxes of the locomotive driver axles, said side frames being substantially channel-shape in cross section with outwardly presented flanges, vertically disposed reinforcing flanges on the lower flanges of said side frames, which vertically disposed flanges extend over the journal box openings, and pedestal jaws to the sides of said openings.

8. A locomotive bed comprising a pair of integrally connected cast side frames, and pilot beam engaging members integral with and connecting the forward ends of said side frames.

9. A locomotive bed comprising a pair of integrally connected cast side frames, and a pony truck center guide integral with the forward portions of said side frames.

10. A locomotive bed comprising a pair of integrally connected cast side frames, and a cylinder saddle integral with and arranged between the forward portions of said frames.

11. A locomotive bed comprising a pair of integrally connected cast side frames, and front end brace brackets integral with the forward portions of said side frames.

12. A locomotive bed comprising a pair of integrally connected cast side frames, and brackets on said side frames, which brackets are adapted to serve as points of attachment for equalizers and swing hangers.

13. A locomotive bed comprising a pair of integrally connected cast side frames, and expansion plate brackets integral with said side frames.

14. A locomotive bed comprising a pair of side frames, exhaust tubes integral with and connecting the forward portions of said side frames, and a cylinder saddle integral with and connecting the forward ends of said side frames.

15. A locomotive bed comprising a pair of side frames provided with openings adapted to receive the journal boxes of the locomotive driving axles, transversely disposed members integral with said side frames and arranged in pairs immediately adjacent to the journal box openings, the upper members of said pairs constituting expansion plate brackets.

16. The hereindescribed locomotive bed comprising a pair of side frames adapted to receive the journal boxes of the locomotive driving axles, cross braces integral with said side frames, expansion plate brackets integral with said side frames, a cylinder saddle integral with said frames, and a pony truck center guide integral with the forward portions of said frames.

In testimony whereof I hereunto affix my signature in the presence of two witnesses, this 21st day of October, 1915.

HARRY M. PFLAGER.

Witnesses:
O. T. LEDFORD,
FRED W. DIECKMANN.